United States Patent [19]

Marino et al.

[11] Patent Number: 4,682,717

[45] Date of Patent: Jul. 28, 1987

[54] NOZZLES FOR CASTING ALUMINUM-KILLED STEELS

[75] Inventors: Emilio Marino; Raffaele Mastromarino, both of Rome, Italy

[73] Assignee: Deltasider SpA, Piombino, Italy

[21] Appl. No.: 628,282

[22] Filed: Jul. 6, 1984

[30] Foreign Application Priority Data

Jul. 27, 1983 [IT]  Italy .............................. 48759 A/83

[51] Int. Cl.$^4$ ............................................ B22D 41/00
[52] U.S. Cl. .................................... 222/591; 501/123
[58] Field of Search ................ 222/591, 566; 164/335, 164/337, 437; 501/123

[56] References Cited

U.S. PATENT DOCUMENTS

| | | | |
|---|---|---|---|
| 3,523,804 | 8/1970 | Fukatsu et al. | 106/58 |
| 3,540,899 | 11/1970 | Alper et al. | 106/58 |
| 4,549,677 | 10/1985 | Marino et al. | 222/591 |

FOREIGN PATENT DOCUMENTS

| | | | |
|---|---|---|---|
| 0165274 | 12/1980 | Japan | 222/591 |
| 7071860 | 5/1982 | Japan | 222/591 |

*Primary Examiner*—Joseph J. Rolla
*Assistant Examiner*—Michael S. Huppert
*Attorney, Agent, or Firm*—Young & Thompson

[57] ABSTRACT

The improvement consists in forming the nozzles in two parts, the first as a body made of a refractory material, preferably zirconium oxide or magnesite, having a central axial cavity passing right through it, and the second as a body of a calcium-oxide based refractory material, having an appropriate passage for the liquid steel and located in said axial cavity.

2 Claims, 1 Drawing Figure

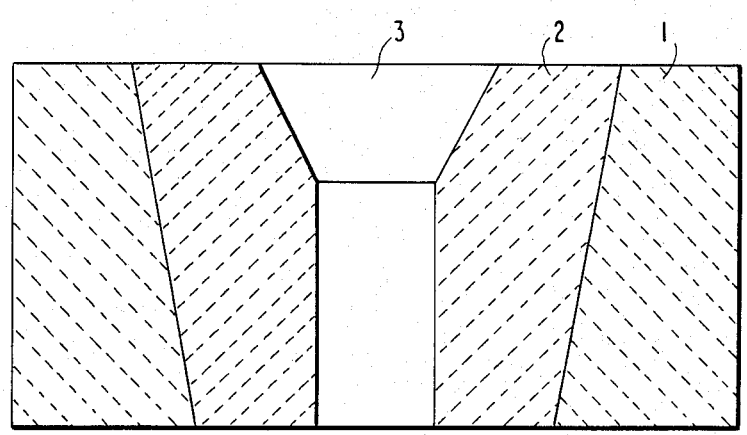

NOZZLES FOR CASTING ALUMINUM-KILLED STEELS

The present invention refers to an improvement in nozzles for the casting of aluminium-killed steels. More precisely it concerns a new type of nozzle, particularly suitable for use in the continuous casting of aluminium-killed steels.

The nozzle is formed of two coaxial elements, the outermost of which is made of conventional refractory material and the innermost of calcium-oxide based refractory, complete with passage for the liquid steel.

In Italian patent application No. 48757 A/82 filed by the Centro Sperimentale Metallurgico SpA, the drawbacks connected with casting—particularly continuous casting—of aluminium killed steel are discussed. It may be recalled briefly here that the openings of refractory nozzles usually become clogged very rapidly by alumina deposits, thus making it difficult or even impossible to continue the casting operation.

In the above patent application, a description is also given of how the use of calcium-oxide based refractory nozzles permits this difficulty to be overcome in a surprising manner; indeed, casting runs lasting up to forty-five minutes have been possible on a pilot plant without any sign of alumina deposits. In a subsequent trial on an industrial scale, these results were confirmed and the useful casting times were greatly increased.

However, some problems were encountered regarding the mechanical strength of the nozzles and their thermal conductivity which, in some cases, permitted the solidification of steel on the edge of the casting hole.

The present invention overcomes these drawbacks by providing a new type of nozzle which permits lengthy casting runs of aluminium-killed steels while at the same time ensuring good mechanical strength.

According to the present invention, these objectives are attained by forming the nozzles in two separate, coaxial parts. The outermost of these two parts, made of the usual refractory materials, preferably zirconium oxide or magnesite, has an axial opening passing right through the piece, while the innermost part is made of a calcium-oxide based refractory material and also has a passage right through it for the liquid steel.

The outermost part ensures that the nozzle has good mechanical strength, while the innermost part of calcium-oxide based material prevents the formation of alumina deposits, thus permitting long trouble-free casting runs.

The present invention will now be described in greater detail by reference to an embodiment that is given purely by way of example and must in no way be construed as limiting the scope of the invention. The embodiment is illustrated in the accompanying FIGURE which is a vertical section through the improved nozzles as per the invention.

As is evident from the FIGURE, the improved nozzle as per the invention is formed of an outer part 1 made of conventional refractory material, which has a cavity that tapers from top to bottom, in which is housed coaxially an inner part 2 made of calcium-oxide based refractory material that has an axial passage 3 for the liquid steel. Nozzles as per this invention can be prepared in various ways, some exemplificative indications thereon are given below.

The outermost refractory body, of zirconium oxide or magnesite, for instance, is prepared at the appropriate particle grading by quite conventional techniques which will not, therefore, be described here. The material for the innermost body, is prepared by mixing 90 to 99% by weight of calcium hydroxide, with at least one compound selected from the metal oxides $Fe_2O_3$, $Al_2O_3$ and $TiO_2$ and the chlorides $CaCl_2$, $NaCl$ and $LiCl$, in quantities ranging between 1 and 10% by weight. The mixture is made with sufficient water to permit the production of pellets that are first dried at 100°–150° C. and then baked at 800°–1600° C. The pellets thus obtained are subsequently crushed.

The crushed material is then treated by mixing with between 3 and 20% by weight of at least one compound selected from the metal oxides $MgO$, $Fe_2O_3$, $Al_2O_3$, $TiO_2$, $ZrO_2$, $Cr_2O_3$ and $MoO_3$, and the chlorides $CaCl_2$, $NaCl$ and $LiCl$, as well as with organic binding and carrier compounds such as oil, paraffin, kerosene, lower alcohols and resins in quantities ranging between 1 and 5% by weight.

At this point, therefore, we have a conventional ground refractory and a mixture consisting essentially of a calcium-oxide base. The ground material and the mixture can be pressed in moulds at 500 to 1500 kg/cm$^2$ and baked at 1300° to 1800° C., separately and then, still separately, impregnated with molten pitch under pressure, coked in a reducing atmosphere and then assembled by cementation. Alternatively, the two parts pressed separately can be assembled, baked and then impregnated with pitch and coked.

A third possibility consists in placing the conventional ground refractory first in the pressing mould and of forming a cavity roughly of the required shape into which is placed the calcium-oxide based mixture and the whole is pressed in the mould at 500–1500 kg/cm$^2$, baked at 1300°–1800° C., impregnated with molten pitch under vacuum and then coked.

The nozzles obtained in this manner are very strong and can thus be handled without any special precautions. In commercial use they have permitted 5000 hours of continuous casting without any clogging problems either with alumina or with steel.

We claim:

1. A nozzle for casting aluminium-killed steel, which is in two separate coaxial parts, the outermost of which consists essentially of a refractory material selected from the group consisting of zirconia and magnesite and having an axial cavity therethrough, the innermost part, housed in said cavity, being of calcium-oxide based refractory and having a passage therethrough for liquid steel and consisting essentially of between 90 and 99% (by weight) of calcium hydroxide with at least one compound selected from the metal oxides $Fe_2O_3$, $Al_2O_3$ and $TiO_2$ and the chlorides $CaCl_2$, $NaCl$ and $LiCl$, in quantities between 1 and 10% by weight, said mixture being pelletized, dried at 100°–150° C. and then baked at 800°–1600° C. after which it is crushed, the crushed material then being further mixed with between 3 and 20% by weight of at least one compound selected from the metal oxides $MgO$, $Fe_2O_3$, $Al_2O_3$, $TiO_2$, $ZrO_2$, $Cr_2O_3$ and $MoO_3$ and the chlorides $CaCl_2$, $NaCl$ and $LiCl$ and with organic binder and carrier compounds selected from oil, paraffin, kerosene, lower alcohols and resins in quantites between 1 and 5% by weight.

2. A nozzle as claimed in claim 1, in which said innermost part and the outermost part are formed by pressing at 500 to 1500 kg/cm$^2$, baked at 1300° to 1800° C., vacuum-impregnated with molten pitch and coked.

* * * * *